RATE DETERMINING EQUIPMENT

INVENTOR
C.L.WHEELER
BY Donald M Duft
ATTORNEY

Feb. 25, 1964 C. L. WHEELER 3,122,611

RATE DETERMINING EQUIPMENT

Filed Sept. 20, 1960 2 Sheets-Sheet 2

INVENTOR
C. L. WHEELER
BY Donald M Duft
ATTORNEY 3,122,611

RATE DETERMINING EQUIPMENT

Charles L. Wheeler, Detroit, Mich., assignor to American Telephone and Telegraph Company, New York, N.Y., a corporation of New York Filed Sept. 20, 1960, Ser. No. 57,237
12 Claims. (Cl. 179—18)

Figure 1:
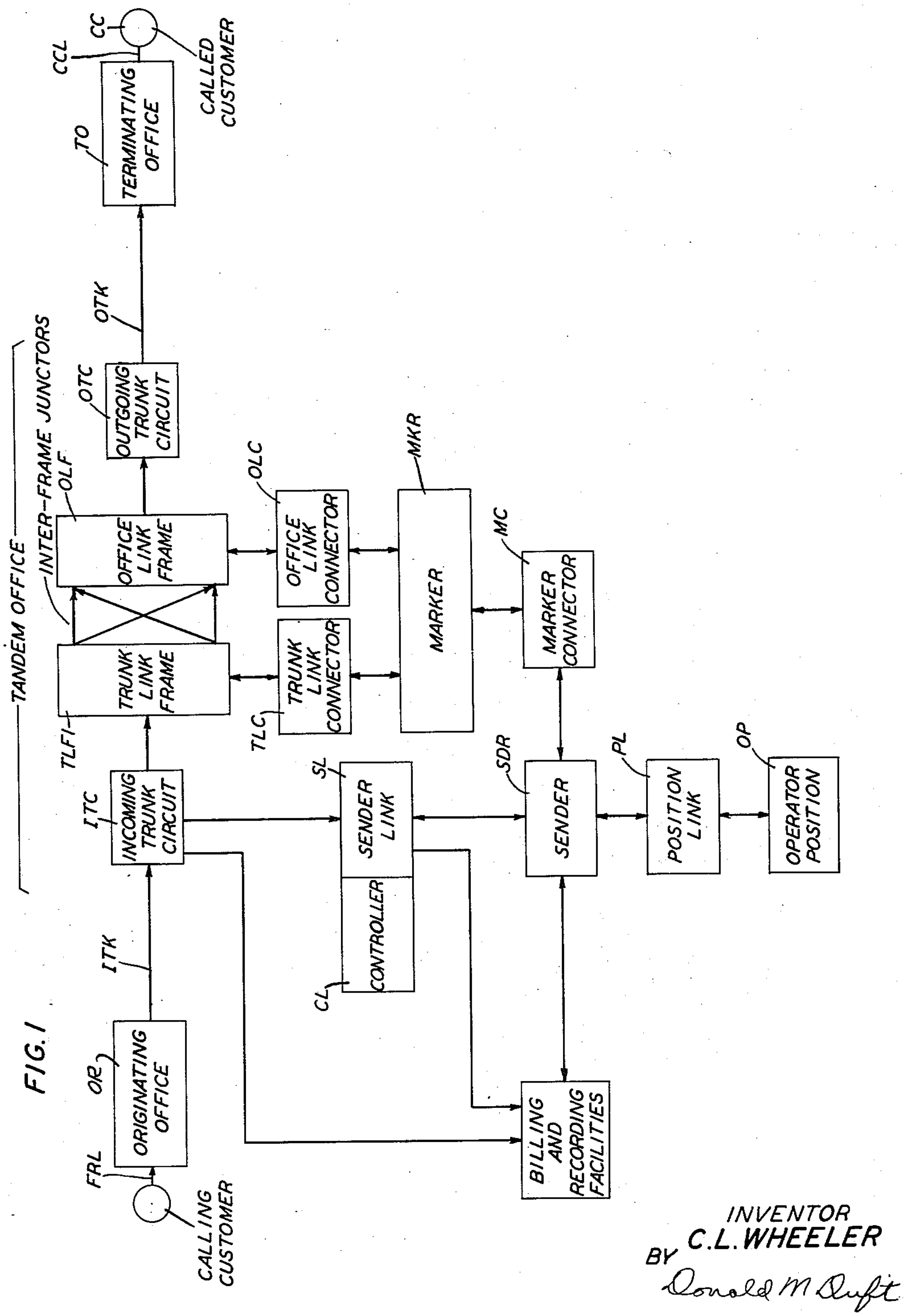

This invention generally relates to telephone switching equipment that automatically determines the rate treatment for customer service and particularly relates to equipment at a centralized call recording and switching center for simplifying the charge rate determining procedures for flat rate customer calls.

Flat rate telephone service is offered to customers, such as residential telephone users, for a stipulated monthly charge which covers all calls to other telephone stations within a specified area. This service is often provided in automatic telephone systems because no records of calls completed within the originating flat rate area are required for charging purposes and, as a result, the only automatic call recording equipment that need be provided in the local originating office is that necessary to record charge data for calls directed to offices external to the originating flat rate area. As a result, flat rate service frequently reduces the volume of extra charge calls to the point where it is too small to justify economically the installation of automatic call recording equipment in many local offices. In such cases, a current practice is to centralize facilities in a tandem office for recording the extra charge call data for a number of such local offices. A tandem office of this type is known in the art as a centralized call recording center.

Although the aforementioned practice largely overcomes major economical obstacles, in doing so, it gives rise to a number of technological problems unique to centralized call recording systems. One such problem is the complex equipment arrangements used to handle flat rate and extra charge rate calls from flat rate customers served by local offices which are not equipped with automatic call recording facilities. These arrangements have heretofore required equipment at the individual local offices to determine the call rate treatment for these customers by screening each of their originated calls to ascertain whether its terminating point is within or without the flat rate calling area. As a consequence of this screening, the originating office equipment segregates the flat rate and extra charge rate calls and routes them over separate groups of tandem trunks to the centralized call recording center in order to simplify the identification of the calls for which no record is required.

A more desirable arrangement than the foregoing would be to route both of the aforementioned types of calls over the same group of tandem trunks to the call recording center and to utilize facilities at the latter point for automatically determining the appropriate rate treatment. Such an arrangement would eliminate the local office screening equipment and would also reduce the amount of route controlling equipment and tandem trunk facilities in the local offices.

Accordingly, a general object of this invention is to simplify the charge rate determining procedures for flat rate customer calls served by centralized call recording systems.

Another object of the invention is to improve centralized call recording systems from the standpoints of equipment economy and efficiency in operation in the serving of calls originated by flat rate customers.

In accordance with the present invention, flat rate customer calls to telephone stations within and without the flat rate calling area are served by the same incoming trunks at the tandem office functioning as a centralized call recording center, and the latter office is adapted to determine automatically the appropriate rate treatment for all calls. In the tandem office, all incoming trunks that serve calls from flat rate customers having identical rate treatments are combined into flat rate trunk groups and are associated with trunk circuits distributed over a plurality of equipment frames. When any one of the trunks is first engaged on a call, the associated trunk circuit is operated to activate equipment that receives the called office code from the originating office and calling customer rate class data from the trunk circuit and then, in response to the receipt of this information, determines the rate treatment for the call.

An advantage of this invention is that local originating office equipment is not required to segregate flat rate customer traffic into two groups and to route it over separate tandem trunks to a tandem office. This allows for major economies in the route controlling and trunk circuit equipments in the local offices. A salient advantage of the invention is its usefulness and adaptability to existing centralized call recording systems.

A feature of the invention is the provision of equipment whereby the same incoming trunk group in a tandem office may serve both flat rate and extra charge rate calls.

Another feature is the provision of equipment in the tandem office for determining automatically the rate treatment for calls served by the incoming trunk groups serving both flat rate and extra charge rate calls.

An additional feature is the provision of equipment in a tandem office for idtentifying the incoming trunk groups serving flat rate and extra charge rate calls for the purpose of ascertaining the terminating offices within and without flat rate calling areas.

Still another feature is the provision of equipment in the tandem office for translating the called office code during each incoming call and for determining whether a flat rate or an extra charge is made for each call.

A further feature includes the provision of facilities for recording charge data for calls in the tandem office and the circuit means provided for utilizing the recording facilities only for the extra charge calls served by the incoming trunk groups serving both flat rate and extra charge rate calls.

The foregoing objects, advantages, and features of the invention, together with others, will be more clearly understood from a consideration of the following description and accompanying drawings.

The telephone system with which the invention is intended to function, by way of example, is disclosed in U.S. Patent 2,848,543, issued August 19, 1958, to R. N. Breed et al. The characteristics and operations of certain apparatus units in the sender, marker connector, and marker circuits of this system are disclosed in the following U.S. patents: 2,235,803, issued March 18, 1941, to W. W. Carpenter, and 2,688,658, issued September 7, 1954, to W. W. Carpenter et al.

Figure 2:
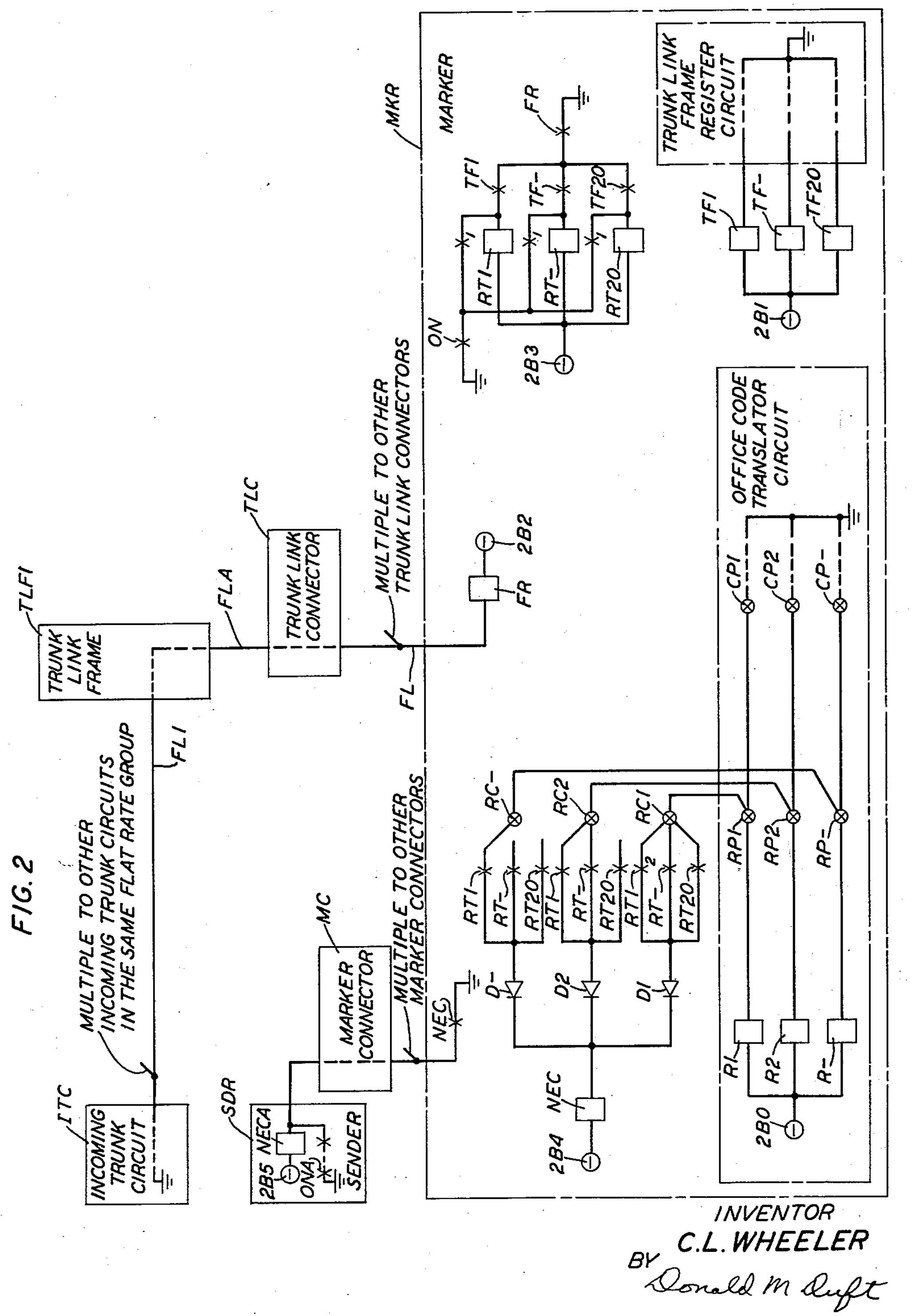

Referring to the drawings:

FIG. 1 shows, in block diagram form, equipment of the tandem office serving as a centralized call recording center; and FIG. 2 schematically depicts the rate determining equipment connected in an operative arrangement with apparatus units of the marker and sender circuits.

It will be noted that FIG. 2 employs a type of notation referred to as "detached contact" in which an "X" represents a normally open contact of a relay; "normally" referring to the unoperated condition of a relay. The principles of this type of notation are described in an article entitled "An Improved Detached-Contact-Type of Schematic Circuit Drawing," by F. T. Meyer in the September 1955 publication of the American Institute of Electrical Engineers Transactions, Communications and Electronics, volume 20, pages 505–513.

It is also noted that the invention is particularly concerned with the parts of the incoming trunks, trunk link frame, trunk link connector, marker, marker connector, and sender circuits which are shown on FIG. 2. The other circuit units of the system comprise no part of the present invention and are neither shown nor described in detail herein except in reference to the block diagram of FIG. 1. For a complete understanding of the construction of the latter units and of their operations in performing their functions, it is intended that reference be made to the previously identified patents.

The general organization of the principal circuit units of the system will now be described with reference to FIG. 1. All incoming trunks from local originating offices terminate in the tandem office at incoming trunk circuits which appear on trunk link frames. All outgoing trunk circuits and trunks to terminating offices appear on office link frames. Illustrative fo these arrangements are the incoming trunk ITK and trunk circuit ITC associated with the trunk link frame TLF1, and the outgoing trunk circuit OTC and trunk OTK associated with the trunk link frame OLF. A plurality of incoming and outgoing trunks and trunk circuits are usually grouped on their respective frames in conformity with the traffic requirements. Incoming and outgoing trunks are interconnected by means of apparatus units (not shown) of the switching network composed of incoming and outgoing trunk circuits, trunk and office link frames and interframe junctors.

Marker circuits, such as marker MKR, control the apparatus units (not shown) of the trunk and office link frames through trunk and office link connectors, such as connectors TFC and OFC, to establish connections between incoming and outgoing trunks.

Incoming trunks have access to senders, such as sender SDR, through incoming trunk circuits and sender links, such as link SL. The trunk to sender connections are established with the aid of controller circuits, such as controller CL, associated with the sender links. A sender circuit is used on each call to receive and register information regarding the location of incoming trunk circuits on trunk link frames, and the called office code and called customer line number. The sender is also arranged to convey all of this information except the called customer line number to a marker through a marker connector, such as connector MC, to enable the marker to perform the necessary translating and control functions required to establish a communication channel between incoming and outgoing trunks and to prescribe for the sender the character of outpulse signaling to be used to control equipment at completing and terminating offices.

The system is also equipped with circuit equipment for determining the rate treatment for flat rate customer calls. The circuit, illustrated in FIG. 2, comprises apparatus units of the incoming trunk circuit, trunk link frame, trunk link connector, marker, marker connector, and sender. As is hereinafter described, this circuit functions to indicate those calls that are within the flat rate calling area. It also functions to inform the sender of the appropriate charge rate for flat rate customer calls and when operator assistance is not required for identifying the called customer number and when no billing record of a call is required.

Position link circuits, such as circuit PL, are used to interconnect operator position circuits, such as circuit OP, and calling customer lines via a sender, sender link, incoming trunk circuit, incoming trunk, and originating office equipment. An operator attends each position circuit and functions during the processing of an extra charge call to orally obtain calling customer directory number and to manually operate the keys (not shown) of the position circuit to pass that number to a sender for billing purposes. The functions of the operator position circuit, position link circuits, and of the operator are required only on those customer calls which involve an extra charge and for which a billing record must be made.

The billing and recording facilities are associated with certain senders, sender links, and incoming trunk circuits to record the billing data derived therefrom for extra charge calls.

The cooperation of the various circuit units with one another in affecting the establishment of a communications channel through the tandem office will now be described by tracing a call from a flat rate customer line served by a local office which is not equipped with automatic call recording facilities. This call will be completed to a called customer line served by a terminating office within the flat rate customer calling area.

Referring again to FIG. 1, it is assumed that a call has been originated over the flat rate customer line FRL served by the originating office OR and that control equipment (not shown) at office OR is operated to receive and register the called office code and called customer line number dialed by the calling party and to thereafter effect seizure of the associated trunk ITK. It is further assumed that this call is directed to the called customer CC. As is fully described in the previously mentioned Breed et al. patent, when trunk ITK is seized, the related incoming trunk circuit ITC recognizes the seizure and operates to signal the controller CL via the sender link SL to activate the sender link SL to connect the seized trunk ITK to the sender SDR. The sender link SL and controller CL, upon activation, proceed to inform the sender SDR of the number of trunk link frame TLF1 on which the trunk ITK is located. The sender SDR then proceeds to register this data.

After the sender link SL and controller CL have performed these operations, controller CL effects the transmission of a signal to the originating office OR to notify equipment (not shown) of that office that the tandem sender SDR is prepared to receive therefrom the pulses that compose the digits of the called office code and called customer line number. Thereafter, the controller CL is released and the data is pulsed forward from equipment (not shown) of office OR over trunk ITK through switching apparatus (not shown) of trunk circuit ITC and sender link SL to registers (not shown) in sender SDR.

Immediately following the registration of the called office code in the sender SDR, the latter circuit is connected to the marker MKR through the marker connector MC and it transfers to the marker MKR the called office code and frame number on which trunk ITC is located.

The marker MKR is equipped with an office code translator circuit which translates the called office code and supplies control information required to complete called connections and to determine the call rate treatment. The essential elements of this circuit are shown in FIG. 2 to illustrate the manner in which the rate determining equipment may be connected with equipment of the marker MKR. A detailed disclosure of a translator circuit arrangement suitable for use in the instant embodiment is described in U.S. Patent 2,235,803, issued March 18, 1941, to W. W. Carpenter. As is described in the latter patent, the translator circuit includes a plurality of route relays each of which supplies separate control information required by the marker MKR to complete call connections to various completing and terminating offices served by the tandem office. In many instances, one or more route relays are provided in the marker MKR to supply different information required to complete call connections betwen different originating offices and one completing or terminating office because of the diverse characteristics of equipment at originating offices and the different distances between the latter offices and the completing or terminating offices. The translator circuit in the exemplary embodiment of FIG. 2 translates the called office code in a manner not shown in the drawings and grounds one of the code points CP1, CP2, or CP– to complete a circuit for operating an appropriate one of route relays R1, R2, or R– which supplies the control information. The operate circuits for the route relays extend from ground through the code points CP1, CP2, and CP–, leads cross-connected to the route code points RP1, RP2, and RP– and the route relay windings to battery 2B0. Contacts (not shown) of the route relays close circuit paths (not shown) to supply control information pertinent to the outgoing trunk circuits and trunk to be used to establish terminating call connections. Additional information supplied under control of the route relays to the sender SDR for outpulsing includes the particular type of pulsing (dial, revertive, or multifrequency), the number of digits to be outpulsed, and the speed and signal level of pulse transmission. For purposes of illustrating the functions of the invention, it is assumed that ground potential is connected through the code points CP1 and RP1 and the winding of the route relay R1 to battery 2B0 for operating relay R1 to control the establishment of call connections over the outgoing trunk circuits OTC and trunk OTK to the terminating office TO.

The translator circuit of FIG. 2 also supplies to the rate determining equipment the information which indicates the various completing and terminating offices to which call connections can be established. The manner in which the two circuits cooperate with each other is described in the subsequent paragraphs.

The marker MKR is arranged to function with a maximum of twenty trunk link frames and is provided with a trunk link frame relay to identify each of these frames. Three of these relays, shown in FIG. 2, are designated TF1, TF–, and TF20; and each identifies, respectively, the trunk link frames TLF1, TLF2–19 (not shown), and TLF20 (not shown). These relays are controlled by the trunk link frame register circuit of FIG. 2, which is shown mainly in block diagram form therein because such a circuit is well known in the art. For example, it may be similar to the district frame register circuit disclosed in U.S. Patent 2,235,803, issued March 18, 1941, to W. W. Carpenter. Therefore, the description of the trunk link frame register circuit is of a general nature and only those details necessary for complete understanding of the invention are presented. The register circuit of FIG. 2 stores the trunk link frame number transferred thereto, as previously explained, from the sender SDR via the connector MC, and it closes a circuit path whereby the frame relay TF1 is operated to identify the frame TLF1 on which appears the incoming trunk circuit ITC. The obvious operate path for relay TF1 extends from ground in the register circuit through the relay winding to the battery 2B1. Similar operate paths are used to control the relays TF– and TF20. Contacts of the relays TF1, TF–, and TF20 are used to control the operating circuits for the rate treatment relays RT1–20 of FIG. 2 and facilitate the expansion of rate treatment information as is hereinafter described.

Referring again to FIG. 1, the marker, under control of the operated route relay R1, seizes the office link frame OLF through the office link connector OLC to select the outgoing trunk circuit OTC and trunk OTK to the called terminating office TO. With knowledge of the trunk link frame involved on the instant call, the marker MKR then seizes the frame TLF1 through the trunk link connector TLC and proceeds to test the available communication channels for interconnecting the incoming trunk circuit ITC and outgoing trunk OTK. After finding an available channel therebetween, it effects the operation of switches (not shown) on the trunk and office link frames TLF1 and OLF to close through that channel. This channel is extended further by the trunk circuit ITC through the sender link SL to the sender SDR and provides a path for subsequently outpulsing information from the sender SDR to control equipment (not shown) at the terminating office TO to establish interconnections between trunk OTK and the called customer line CCL. After this channel is established, marker MKR passes to the sender SDR by way of the connector MC, the route relay information regarding the character of outpulsing to be sent over the established connections.

Before tracing the call further through the system, it is desirable first to review certain assumptions upon which the operation of the exemplary embodiment of the invention is based. The present embodiment is devised for use with a plurality of trunks extending between the tandem office and various originating offices. These trunks are terminated at incoming trunk circuits which are proportionately distributed over a maximum of twenty trunk link frames. All incoming trunks and trunk circuits that handle traffic from flat rate customers entitled to the same rate treatment are located on one trunk link frame and are identified as a flat rate group. Twenty flat rate groups are therefore available with one group located on each of twenty trunk link frames. A group may include trunks and trunk circuits associated with one or more offices from which flat rate customer calls originate. When any of the trunks and trunk circuits is engaged on a customer call, the trunk circuit is arranged to operate a flat rate relay in a tandem marker to inform the marker that it and the associated trunk are in a flat rate group on one of twenty trunk link frames. The marker combines this identifying information with the known identity of the trunk link frame on which the engaged trunk circuit appears and operates one of twenty rate treatment relays in the marker to identify the particular flat rate group and to determine the terminating offices to which calls are extended from the engaged trunk on a flat rate basis. The operated rate treatment relay cooperates with the office code translator circuit in the marker to operate a no-extra charge relay in the marker which signifies when the call is to be completed to an office within the calling customer flat rate calling area. When it is operated, the latter relay in turn effects the operation of a no-extra charge auxiliary relay in the sender circuit associated with the marker to inform the sender that operator assistance and a charge record are not required for the call. The sender circuit then cancels the operations of the position link and operator position circuits, and of the billing and recording facilities.

Returning now to the previous description concerned with tracing a call through the system, the further operations of the rate determining circuit will be described with reference to FIG. 2. When the marker MKR seizes the trunk link frame TLF1, as previously mentioned, a circuit path is completed for operating the flat rate relay FR to inform the marker MKR that it is handling a flat rate customer call. This circuit path extends from ground through a relay contact (not shown) in the incoming trunk circuit ITC, lead FL1, switch gear (not shown) of the trunk link frame TLF1, lead FLA, switch gear (not shown) of the trunk link connector TLC, lead FL, and the winding of relay FR to battery 2B2. The lead FL1 of the latter circuit path is multipled from the frame TLF1 to all incoming trunk circuits in the same flat rate group to permit each of them to utilize the same circuit path through the frame TLF1, lead FLA, connector TLC, and lead FL to operate relay FR when one of these trunk circuits is engaged on a call. Circuit paths, similar to the one illustrated on FIG. 2, may be provided from a flat rate group of incoming trunk circuits (not shown )on a maximum of nineteen other trunk link frames (not shown), through the latter frames and the trunk link connectors associated therewith to the lead FL multiple for operating the FR relay when a trunk circuit in one of these groups is engaged on a call.

The operation of the relay FR completes a circuit for operating one of twenty relays in the marker MKR which control, as hereinafter explained, the rate treatment to be accordded to customer calls handled by the flat rate group of incoming trunk circuits located on the frames TLF1–20. Three of these relays, shown on FIG. 2, are designated RT1, RT–, and RT20; and each represents, respectively, the flat rate groups on the trunk link frames TLF1, TLF2–19 (not shown), and TLF20 (not shown). The individual operate circuits for the relays RT1–20 extend from ground through the make contact of relay FR, contacts of the trunk link frame identifying relays TF1–20, and the windings of the RT1–20 relays to battery 2B3. Locking paths are provided for each of the RT1–20 relays through the contact 1 of the respective relays RT1–20 and a make contact of the off-normal relay ON (not shown) to ground to maintain an operated RT1–20 relay operated after the marker MKR and trunk circuit are disconnected and relay FR is released. The operation of the ON relay (not shown) occurs when the marker MKR is connected with the sender SDR and remains operated to control various circuit paths in the marker MKR and circuits associated therewith until the marker MKR has completed its functions and is released. When the FR relay is actuated during the progress of the instant call, the RT1 relay will be operated and locked operated over the aforementioned circuit path. Shortly after relay RT1 is locked operated, the marker MKR effects the release of the connectors TLC and OLC, and in turn the release of relay FR.

The rate determining circuit employs a no-extra charge relay NEC, shown on FIG. 2, with its operate winding connected in multiple with the diodes D1, D2, and D3, and the various contacts of the rate treatment relays RT1, RT–, and RT20 to the rate code points RC1, RC2, and RC–. Each of the latter code points is connected with the office code translator circuit by means of a separate conductor to the route code points RP1, PR2, and RP– which are associated, respectively, with the code points CP1, CP2, and CP–. As was previously mentioned, the office code translator circuit supplies the rate determining circuit with the information which indicates the various completing and terminating offices to which call connections can be established from the tandem office. This information consists of connecting a ground potential, in accordance with the called office code, to the rate code points RC1, RC2, and RC– via the code points CP1, CP2, CP–, RP1, RP2, and RP–. Each of the rate code points in the illustrtaed embodiment identifies a particular completing or terminating office served by the tandem office. The ground potential connectable to the latter code points can be extended through operated contacts of the relays RT1, RT–, and RT20, the associated diodes D1, D2, and D–, and the NEC relay winding to battery 2B4 to operate relay NEC on those flat rate customer calls within the flat rate calling area that are completed without an extra charge and that do not require operator assistance or a record of the call to be made. The pattern for operating the relay NEC is established by contacts of relays RT1, RT–, and RT20; that is, contacts of these relays are added in the parallel operate paths for relay NEC extending between the diodes D1, D2, and D– and the rate code points RC1, RC2, and RC– to specify the terminating offices within the flat rate calling area for customer calls served by incoming trunks and trunk circuits in various flat rate groups. The diodes D1, D2, and D– are used for isolation purposes between the rate code points and route code points and are poled to prevent back-ups and false operations of more than one route relay at a time. The diodes provide a low forward impedance path for operating the relay NEC and high impedance path between a grounded one of the rate code points connected with an operated route relay and the other ungrounded rate code points connected to unoperated route relays.

It will be recalled from the foregoing discussion that ground potential is assumed to be connected to the code points CP1 and RP1 for operating the route relay R1 to enable marker MKR to handle the call being traced through the system. Under this condition, when the relay RT1 is operated, as previously explained, the ground potential is extended further from code point RP1 over the lead cross-connected to the code point RC1 through the latter point, contact 2 of relay RT1, diode D1, and the NEC relay winding to battery 2B4 to operate relay NEC and thereby signify that no extra charge is made for this call. Upon operating, relay NEC closes its make contact to extend ground potential through relay contacts (not shown) of connector MC to the sender SDR and the winding of the no-extra charge auxiliary relay NECA of FIG. 2 to battery 2B5 to operate relay NECA which then locks operated through its own make contact and operated contact of the off-normal auxiliary relay ONA (not shown) in the sender SDR. The operation of relay ONA (not shown) occurs when the sender SDR is connected with the incoming trunk circuit ITC and remains operated to control various circuit paths in the sender SDR until the sender SDR has completed its functions and is released. Contacts (not shown) of relay NECA are utilized, in a manner not shown in the drawings, by the sender SDR to cancel the operation of the position link PL, operator position OP, and the billing and recording facilities on the call in progress.

When the marker MKR has completed the foregoing circuit operations and others, which are not described herein because they are not necessary for an understanding of the invention, the marker MKR and connector MC are released.

Referring again to FIG. 1, after the sender SDR has received the last digit of the called customer number from the originating office, it immediately operates in accordance with the charging information received from rate determining equipment in the marker MKR to outpulse control signals to the terminating office TO for operating equipment (not shown) thereat to establish call connections from the outgoing trunk OTK to the called customer line CCL. The character of the outpulsed control signals is determined, as previously explained, by the route relay R1 in the marker MKR. Sender SDR outpulses to the terminating office TO via switching gear (not shown) of the sender link SL, incoming trunk circuit ITC, trunk link frame TLF1, over interframe junctors, office link frame OLF, outgoing trunk circuit OTC, and the outgoing trunk OTK.

After transmitting the control signals to the office TO, the sender SDR signals the incoming trunk circuit ITC to establish connections between the incoming trunk ITK and the communication channel extending through the trunk and office link frames TLF1 and OLF, outgoing trunk circuit OTC, and trunk OTK to the terminating office TO. The sender SDR then allows the incoming trunk circuit ITC to assume supervision over the call connections until the conclusion of the call. The sender SDR and sender link SL are then released.

To illustrate an additional way in which the instant invention simplifies procedures for determining flat rate customer charges in the instant centralized call recording system, a brief description will now be given of the manner in which circuits of the tandem office would normally function on the instant call without the rate determining equipment. It should be observed from this description that the equipment operations and operator functions associated with recording the call data would unduly delay the completion of the call and add to the holding time of other switching equipments because the instant call is within the flat rate calling area and no extra charge is required therefor. This description is based on the assumption that equipment is not provided in the office OR for screening the call to determine whether the terminating office TO is within or without the customer flat rate calling area. Another assumption is that one trunk facility is used to handle both flat rate and extra charge traffic. It will be recalled from the previous description that, after the last digit of the called customer number was received by the sender SDR from the originating office OR, sender SDR immediately operated, in accordance with the charge information received from the rate determining circuit in the marker MKR to outpulse control signals to the office TO in order to establish call connections from the trunk ITK to the called customer line CCL. When the rate determining equipment is not provided, however, the outpulsing by sender SDR is delayed and the following operations occur. Referring to FIG. 1, the sender SDR signals the position link circuit PL to connect the operator position circuit OP into a talking path to the calling customer by way of equipment (not shown) of the position link PL, sender link SL, trunk circuit ITC, trunk ITK, office OR, and the line FRL. The operator attending the position OP is then given a "zip" tone as an indication to make an oral request for the calling customer directory number from the calling party. Following the receipt of this directory number, the opertaor manually operates a key mechanism (not shown) of the position circuit OP in order to transmit that number to the sender SDR via the position link PL. After the operator has keyed the last digit of the number, the connection between the position circuit OP and the sender SDR is released. The sender SDR then associates itself with the billing and recording facilities and informs it of the calling and called customer numbers. The billing and recording facilities then operate automatically, in a manner described in the aforementioned R. N. Breed et al. patent, to make a record of the telephone call details. Meanwhile, the sender SDR proceeds to transmit the appropriate control signals to the office TO to establish, as hereinbefore explained, call connections between trunk OTK and the called customer line CCL. The call connections are then completed in a manner described in the previous paragraphs.

It is to be understood that the above-described arrangements are illustrative of the application of the principles of this invention. In light of this teaching, it is apparent that numerous other arrangements may be devised by those skilled in the art without departing from the spirit and scope of the invention.

What is claimed is:

1. In a telephone system, an originating office serving the flat rate customer line, a tandem office, a trunk extending between said offices, means in said originating office responsive to calls on said line for extending said calls from said line over said trunk to said tandem office, a plurality of terminating offices each having an identifying office code, means in said originating office operative subsequent to the extension of said calls for transmitting over said trunk signals representing the desired terminating office code for each of said calls, means in said tandem office operable for interconnecting said trunk with a number of said terminating offices on a flat rate basis and with all of the other terminating offices on an extra charge rate basis, an equipment frame in said tandem office, and circuit means in said tandem office associated with said trunk on said frame and operative in response to the extension of said calls over said trunk for operating said interconnecting means to interconnect said trunk and said terminating offices, said interconnecting means comprising means responsive to the operation of said circuit means for identifying said trunk, means controlled by the operation of said circuit means for identifying said frame, means responsive on each call to translate said office code signals, and means jointly controlled by said frame identifying means, by said trunk identifying means, and by said translating means to determine said terminating offices to which interconnections are established on a flat rate basis.

2. In a telephone system, an originating office serving a flat rate customer line, a tandem office, a trunk extending between said offices, means in said originating office responsive to calls on said line for extending said calls from said line over said trunk to said tandem office, a plurality of terminating offices, means in said tandem office operable for interconnecting said trunk with a number of said terminating offices on a flat rate basis and with all of the other terminating offices on an extra charge rate basis, circuit means in said tandem office associated with said trunk and operative in response to the extension of said calls over said trunk for operating said interconnecting means to interconnect said trunk to said terminating offices, means in said tandem office operable under control of said interconnecting means for recording charge data concerning said interconnections, and means in said interconnecting means controlled by said circuit means for rendering said recording means operative only for interconnections established on an extra charge rate basis.

3. In a telephone system, an originating office serving a flat rate customer line, a tandem office, a trunk extending between said offices, means in said originating office responsive to calls on said line for extending said calls from said line over said trunk to said tandem office, a plurality of terminating offices, means in said tandem office operable for interconnecting said trunk with a number of said terminating offices on a flat rate basis and with all of the other terminating offices on an extra charge rate basis, an equipment frame in said tandem office, circuit means in said tandem office associated with said trunk on said frame and operative in response to the extension of said calls over said trunk for operating said interconnecting means to interconnect said trunk and said terminating offices, and means in said tandem office operable under control of said interconnecting means for recording charge data concerning said interconnections, said interconnecting means comprising means responsive to the operation of said circuit means for identifying said trunk, means controlled by the operation of said circuit means for identifying said frame, means jointly controlled by said trunk identifying means and by said frame identifying means for determining said terminating offices to which said interconnections are established on a flat rate basis, and means controlled by said determining means for rendering said recording means operative only for interconnections established on an extra charge rate basis.

4. In a telephone system, an originating office serving a flat rate customer line, a tandem office, a trunk extending between said offices, means in said originating office responsive to calls on said line for extending said calls from said line over said trunk to said tandem office, a plurality of terminating offices each having an identifying office code, means in said originating office operable subsequent to the extension of said calls for transmitting over said trunk signals representing any said office codes, means in said tandem office operable for interconnecting said trunk with a number of said terminating offices on a flat rate basis and with all of the other terminating offices on an extra charge rate basis, an equipment frame in said tandem office, circuit means in said tandem office associated with said trunk on said frame and operative in response to the extension of said calls over said trunk for operating said interconnecting means to interconnect said trunk and said terminating offices, and means in said tandem office operable under control of said interconnecting means for recording charge data concerning said interconnections, said interconecting means comprising means responsive to the operation of said circuit means for identifying said trunk, means controlled by the operation of said circuit means for identifying said frame, means operative on each call for translating said transmitted office code signals, means jointly controlled by said trunk identifying means, by said frame identifying means, and by said translating means for determining said terminating offices to which interconnections are established on a flat rate basis, and means controlled by said determining means for rendering said recording means operative only for interconnections established on an extra charge rate basis.

5. In a telephone system, a tandem office, a trunk for serving flat rate and extra charge rate calls incoming to said tandem office, a plurality of terminating offices each having an identifying office code, means in said tandem office connectable with said trunk on each call for registering signals representing the desired terminating office code, an equipment frame in said tandem office, circuit means in said tandem office associated with said trunk on said frame and operative in response to each call on said trunk for interconnecting said trunk and said registering means, and a control circuit in said tandem office including means for translating office code signals registered in said registering means, means operable for interconnecting said trunk with a number of said terminating offices on a flat rate basis and with all of the other terminating offices on an extra charge rate basis, means controlled by said translating means for operating said interconnecting means to interconnect said trunk with the desired terminating office, and means jointly controlled by said translating means and by said circuit means for determining the appropriate one of said rates for said interconnections, said determining means comprising means responsive to the operation of said circuit means for identifying said trunk, means controlled by the operation of said circuit means for identifying said frame, means jointly controlled by said trunk identifying means and by said frame identifying means for specifying said terminating offices with which said trunk is interconnected on a flat rate basis, and means jointly controlled by said translating means and by said specifying means to signify the appropriate one of said rates for said interconnections.

6. In a telephone system, a tandem office, a trunk for serving flat rate and extra charge rate calls incoming to said tandem office, a plurality of terminating offices each having an identifying office code, means in said tandem office connectable with said trunk in response to calls thereon for registering signals representing said office codes, an equipment frame in said tandem office, circuit means in said tandem office associated with said trunk on said frame and operative in response to calls on said trunk for interconnecting said trunk and said registering means, means in said tandem office associable with said trunk and said circuit means and operable for recording charge data derived therefrom concerning said calls, and a control circuit in said tandem office including means for translating office code signals registered in said registering means, means controlled by said translating means for controlling the interconnection of said trunk with a number of said terminating offices on a flat rate basis and with all of the other terminating office on an extra charge rate basis, and means jointly controlled by said translating means and by said circuit means for determining the appropriate one of said rates for said interconnections, said determining means comprising means responsive to the operation of said circuit means for identifying said trunk, means controlled by the operation of said circuit means for identifying said frame, means jointly controlled by said trunk identifying means and by said frame identifying means for specifying said terminating offces with which said trunk is interconnected on a flat rate basis, means jointly controlled by said translating means and by said specifying means to signify the appropriate one of said rates, and means controlled by said signifying means to render said recording means operative only for interconnections established on an extra charge rate basis.

7. In a telephone system, an originating office serving a flat rate customer line, a tandem office, a trunk extending between said offices, means in said originating office responsive to calls on said line for extending said calls from said line over said trunk to said tandem office, a plurality of terminating offices each having an identifying office code, means in said originating office operative subsequent to the extension of said calls over said trunk for transmitting over said trunk signals representing said office codes, means in said tandem office connectable with said trunk for registering office code signals transmitted thereover, circuit means in said tandem office associated with said trunk and operative in response to the extension of said calls over said trunk for interconnecting said trunk and said registering means, and a control circuit in said tandem office including means for translating office code signals registered in said registering means, means controlled by said translating means for controlling the interconnection of said trunk with a number of said terminating offices on a flat rate basis and with all of the other terminating offices on an extra charge rate basis, and means jointly controlled by said translating means and by said circuit means for determining the appropriate rate for each of said interconnections.

8. In a telephone system, an originating office serving a flat rate customer line, a tandem office, a trunk extending between said office, means in said originating office responsive to calls on said line for extending said calls from said line over said trunk to said tandem office, a plurality of terminating offices each having an identifying office code, means in said originating office operative subsequent to the extension of said calls over said trunk for transmitting over said trunk signals representing said office codes, means in said tandem office connectable with said trunk for registering office code signals transmitted thereover, an equipment frame in said tandem office, circuit means in said tandem office associated with said trunk on said frame and operative in response to the extension of said calls over said trunk for interconnecting said trunk and said registering means, and a control circuit in said tandem office including means for translating office code signals registered in said registering means, means controlled by said translating means for controlling the interconnection of said trunk with a number of said terminating offices on a flat rate basis and with all of the other terminating offices on an extra charge rate basis, and means jointly controlled by said translating means and by said circuit means for determining the appropriate one of said rates for said interconnections, said determining means comprising means responsive to the operation of said circuit means for identifying said trunk, means controlled by the operation of said circuit means for identifying said frame, means jointly controlled by said trunk identifying means and by said frame identifying means for specifying said terminating offices with which said trunk is interconnected on a flat rate basis, and means jointly controlled by said translating means and by said specifying means to signify the appropriate one of said rates for said interconnections.

9. In a telephone system, an originating office serving a flat rate customer line, a tandem office, a trunk extending between said offices, means in said originating office responsive to calls on said line for extending said calls from said line over said trunk to said tandem office, a plurality of terminating offices each having an identifying office code, means in said originating office operative subsequent to the extension of said calls over said trunk for transmitting over said trunk signals representing said office codes, means in said tandem office connectable with said trunk for registering office code signals transmitted thereover, an equipment frame in said tandem office, circuit means in said tandem office associated with said trunk on said frame and operative in response to the extension of said calls over said trunk for interconnecting said trunk and said registering means, means in said tandem office associable with said trunk and said circuit means and operable for recording charge data derived therefrom concerning said calls, and a control circuit in said tandem office including means for translating office code signals registered in said registering means, means controlled by said translating means for controlling the interconnection of said trunk with a number of said terminating offices on a flat rate basis and with all of the other terminating offices on an extra charge rate basis, and means jointly controlled by said translating means and by said circuit means for determining the appropriate one of said rates for said interconnections, said determining means comprising means responsive to the operation of said circuit means for identifying said trunk, means controlled by the operation of said circuit means for identifying said frame, means jointly controlled by said trunk identifying means and by said frame identifying means for specifying said terminating offices with which said trunk is interconnected on a flat rate basis, means jointly controlled by said translating means and by said specifying means to signify the appropriate one of said rates, and means controlled by said signifying means to render said recording means operative only for interconnections established on an extra charge rate basis.

10. In a telephone system, a switching office, a plurality of incoming trunks each used for serving both flat rate and extra charge rate calls, a plurality of outgoing trunks, means in said office operable for interconnecting said incoming trunks with a number of said outgoing trunks on a flat rate basis and with all of the other outgoing trunks on an extra charge rate basis, a plurality of equipment frames in said office each identified with a specific rate treatment, each of said incoming trunks that serve calls entitled to the same rate treatment terminated on said frame identified with said treatment, and circuit means on said frames associated with said incoming trunks and operable in response to both flat rate and extra charge rate calls on any selected incoming trunk for operating said interconnecting means to interconnect said selected trunk with any of said outgoing trunks to the called destination desired by the caller, said interconnecting means comprising means responsive to the operation of said circuit means for identifying said frame on which the selected trunk is terminated, means for identifying said selected trunk, and means jointly controlled by said frame identifying means and said trunk identifying means for determining said outgoing trunks with which interconnections may be established on a flat rate basis.

11. In a telephone system, a switching office, a plurality of incoming trunks each used for serving both flat rate and extra charge rate calls incoming to said office, a plurality of terminating offices each having an identifying office code, means in said switching office operable for interconnecting said trunks with a number of said terminating offices on a flat rate basis and with all of the other terminating offices on an extra charge rate basis, a plurality of equipment frames in said switching office each identified with a specific rate treatment, each of said trunks that serve calls entitled to the same rate treatment terminated on said frame identified with said treatment, and circuit means associated with said trunks on said frames and responsive to flat rate and extra charge rate calls on any selected one of said trunks for operating said interconnecting means to interconnect said selected trunk with any of said called terminating offices, said interconnecting means comprising means controlled by said circuit means for identifying said frame on which the selected trunk is terminated, means for identifying said selected trunk, means responsive to each call on said selected trunk for translating said code of the terminating office with which said selected trunk is interconnected, and means jointly controlled by said frame identifying means and said trunk identifying means and responsive to said code translation for determining whether said interconnection may be established on a flat rate basis.

12. In a telephone system according to claim 11 the combination further comprising means operable on each call served by said trunks for recording charge data concerning said interconnections, and means controlled by said determining means for rendering said recording means operative only for interconnections established on an extra charge rate basis.

References Cited in the file of this patent

UNITED STATES PATENTS

| | | |
|---|---|---|
| 1,924,095 | Griffins | Aug. 29, 1933 |
| 2,165,924 | Goodrum | July 11, 1939 |
| 2,297,365 | Ostline | Sept. 29, 1942 |
| 2,299,212 | Collis et al. | Oct. 20, 1942 |
| 2,698,879 | Shepherd | Jan. 4, 1955 |
| 2,956,127 | Blashfield | Oct. 11, 1960 |